Patented Jan. 16, 1934

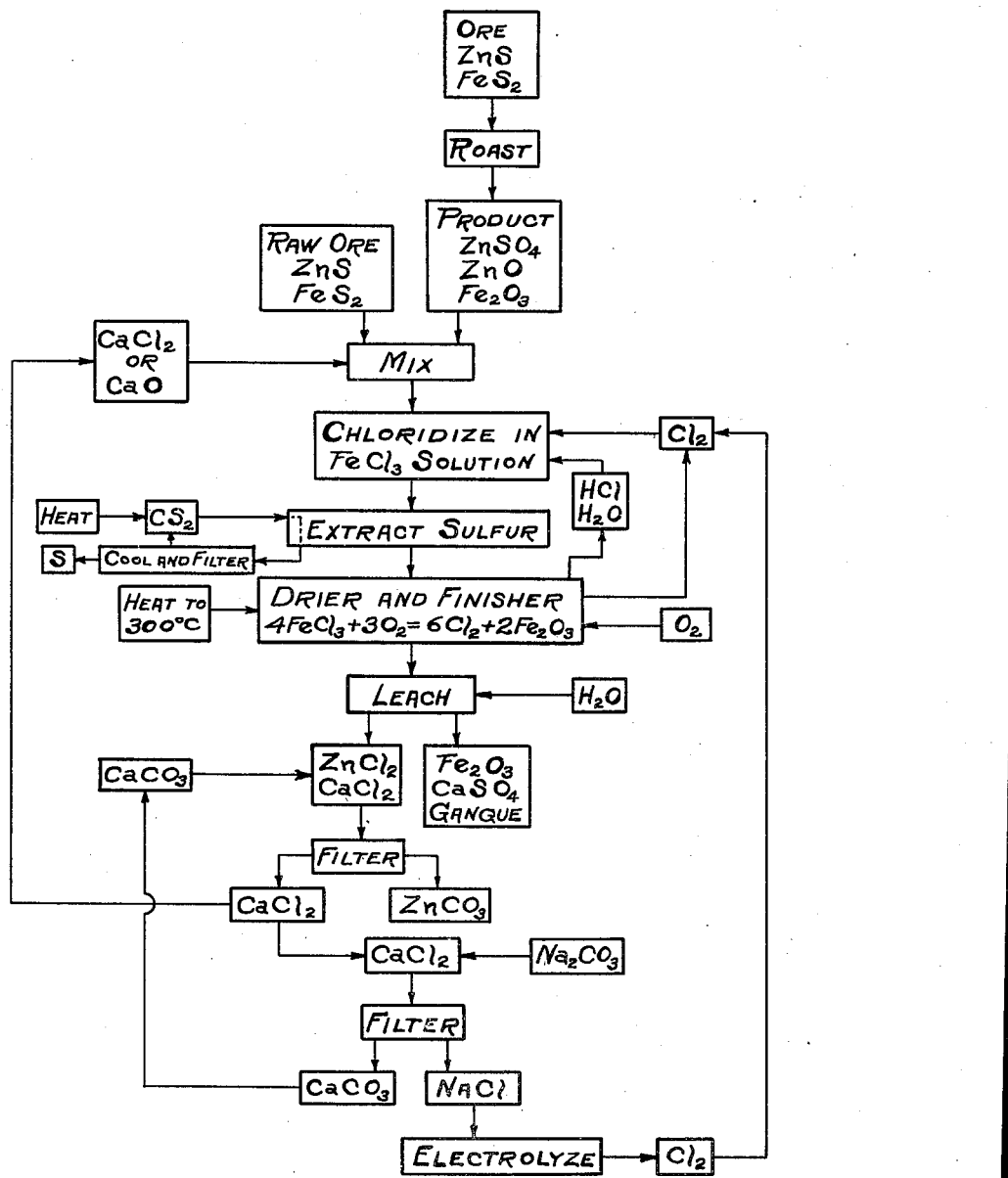

1,943,337

UNITED STATES PATENT OFFICE 1,943,337

METHOD OF TREATING SULPHIDE ORES TO CHLORIDIZE THE SAME

Thomas A. Mitchell, Denver, Colo., assignor to Lafayette M. Hughes, Denver, Colo.

Application April 6, 1931. Serial No. 528,014

18 Claims. (Cl. 75—67)

This invention relates to a method of treating metallurgical sulphide ores and more particularly to a method which involves an efficient and economical use of chlorine for the purpose of converting ore metal sulphides to the chloride form.

It has heretofore been proposed to form chlorides of various sulphide ore metals by digesting the ore in an aqueous solution of ferric chloride while continuously introducing chlorine gas into the bath. In that process it is necessary to hold the sulphide ores in the digestion apparatus until the reactions are completed and particularly until the difficultly chloridized materials, such as zinc ferrite, zinc silicate and the like, have been transposed to the chloride form. This necessitates the use of a large amount of the expensive chlorine as well as the waste of valuable time in carrying on the process. Also, sulphuric acid is produced as the result of undesired secondary reactions due to the formation of sulphur chloride and its oxidation; hence soluble sulphates of various ore metals, such as zinc, are formed and it is impossible to obtain these metals wholly as chlorides. It is for such reasons as these that the process has not proven to be economically practical.

In my Patent No. 1,736,659 I have described certain improvements in processes of that type, and it is one object of my invention to supplement and improve my prior process and to provide a method of chloridizing sulphite ores in which an excessive use of chlorine gas will not be required, and which may be carried on efficiently for a high extraction of the desired ore metal values.

A further object is to provide a process of this type in which that portion of the chlorine which has remained in the reagent salt at the end of the digestion operation will be recovered and used in a further chloridizing step.

A still further object is to provide a preliminary treatment which prepares the ore for efficient chloridization and to supplement the step of digestion by others which render the process satisfactory for treating both simple and complex ores.

With these and other objects in view as will be apparent to one skilled in the art, my invention resides in the combination of process steps as set forth in the specification and covered by the claims appended hereto.

Referring to the drawing, which illustrates diagrammatically one manner of carrying out this invention, I have there shown certain primary steps which relate to the treatment of a simple ore containing zinc and iron sulphides, but it will be appreciated that this invention relates to the complex ores as well and that the process may be materially modified in accordance with the requirements of the particular ore being treated, as will be apparent from the following disclosure and the scope of the claims appended hereto.

In accordance with this invention, I propose to chloridize a metallurgical ore material containing a metal sulphide by digesting the material in a finely divided condition in an aqueous bath containing a chloridizing agent, such as the chlorides of the group consisting of iron, manganese, copper or other metals which are capable of reducing from a high to a lower valency and of giving up chlorine for reaction with ore metal sulphides, and which may be regenerated by an oxidizing agent, such as chlorine gas, for repeated use in the digestion apparatus. In order to recover the chlorine which is found in the reagent at the end of this process step, I further propose to subject the ore material to a finishing stage in which it is heated under oxidizing conditions to a temperature at which the reagent chloride is not stable and so will give up the chlorine for further attack upon the ore.

A particular feature of this invention involves providing a reagent which will preferentially react, to the exclusion of such ore metals as zinc, with all available sulphate ion in the aqueous bath or any sulphate radical which may be present or formed during the subsequent finishing operation in the dry state, thereby minimizing the formation of the sulphate of zinc or other ore metals. For this purpose, I employ an alkaline earth metal compound, such as the hydroxide, oxide or chloride of calcium, strontium or barium, which is capable of reacting with the sulphate ion to form an alkaline earth metal sulphate and which is present in amount sufficient to combine with all of the available sulphate ion or radical present in the digestion bath or formed in the later stages of the process and thereby remove it from the reaction zone as an insoluble alkaline earth metal sulphate.

In order to prepare the sulphide ore for efficient chloridization, I may subject it to a preliminary roasting operation, thereby forming a certain amount of ore metal oxide. The presence of an ore metal oxide in the chloridizing stage is desirable in order to take up any hydrochloric acid formed during the process. Hence this preliminary roasting is carried on to a sufficient extent for obtaining the desired percentage of oxide, or if desired I may combine a raw sulphide ore with another ore which has been completely or partially roasted for the purpose. The roasting operation also serves to remove sulphur from the ore and so minimizes the formation of sulphate ion in the digestion bath, but it is not necessary to remove any large percentage of the sulphur since the alkaline earth material will prevent it from sulphating an ore metal which is desired in the chloride form.

The ordinary sulphide ores usually contain pyrites or iron sulphide which is attacked to some extent by chlorine gas, hence such an ore will develop sufficient ferric chloride in the chlorinator for my purposes, it being understood that only a small amount of this material is necessary since the reagent is being continually regenerated and serves, therefore, as a carrier of chlorine to the ore from the gas introduced into the bath. If a sufficient amount of a suitable compound of the reagent metal is not present in the ore, then I may add as desired such reagents as iron, manganese or copper chlorides or materials capable of developing a satisfactory digestion reagent. The amount of ferric chloride or other reagent developed in the digestion stage by continued action of the chlorine upon the pyrite or other reagent metal compound of the ore should be controlled so as to provide not only sufficient reagent for the aqueous bath process but also to insure the formation, in the subsequent finishing step, of enough nascent chlorine to accomplish the final chloridizing of the unchloridized or the difficultly chloridized portions of the ore.

A further feature of my invention is found in the fact that any free sulphur formed during the initial chloridizing stage may be extracted from the ore by a suitable solution process prior to the material being finally treated in the finishing operation, thereby removing sulphur from the ore and preventing it from wasting chlorine in the formation of sulphur chloride. This extraction of free sulphur may be accomplished by leaching the ore material with hot carbon bisulphide which has the peculiar property of dissolving free sulphur while hot but of permitting it to crystallize out when the solution is cool. In this way the carbon bisulphide may serve as a carrier medium for extracting sulphur from the ore.

It will now be understood that the preferred manner of carrying on this invention involves three stages: first, that of providing an ore mixture of raw sulphide ore and partially roasted ore; then digesting the ore material in a finely divided condition in an aqueous solution of ferric or other equivalent chloride while regenerating the reagent with chlorine gas; and of finishing the operation by drying the slurry and heating it to a temperature at which the ferric chloride or other reagent used is not stable and under conditions which produce nascent chlorine for further attacking the still unchloridized portions of the ore.

Referring now to the drawing which illustrates diagrammatically a complete process involving these three main stages and which is illustrated as a cyclic process applicable to the treatment of a simple ore containing zinc and iron sulphides, the following steps may be carried out: The ore may be first ground to a standard size, as is usually done prior to a roasting operation, and then given an oxidizing roast in accordance with standard practice but preferably at as low a temperature as is feasible so as to avoid the formation of a hard, vitreous mass. The roasting operation is carried on in any standard form of apparatus, such as a Wedge roaster. The heat for the roasting operation, if it is not autogenous, is obtained in any suitable manner, such as by means of a gas burner located at the exit end of the apparatus. For such ores as have a high content of sulphide sulphur, which is easily burned, it is generally sufficient to allow the ore material to attain that temperature which the combustion of the sulphur will produce and without the aid of external heat. During this roasting stage the zinc may go to both the oxide and the sulphate form but any zinc sulphate which is formed during the roasting operation will be converted to a chloride in the digestion apparatus as explained below.

This partially roasted material, which contains zinc oxide, zinc sulphate and iron oxide as well as raw ore, may be combined with further amounts of raw ore in desired proportions, as determined by the requirements of the chloridizing steps. An alkaline earth material, which is preferably calcium oxide or calcium chloride, is added to the ore mixture in amount sufficient to take care of all of the available sulphate radical which is present in the roasted ore and which will be developed during later stages of the process, so that such ore metals as zinc will not be permitted to go to the sulphate form because the sulphate ion has been removed from solution as an insoluble alkaline earth metal sulphate. By analyzing the ore material, one may readily calculate the amount of alkaline earth material to be used, it being added preferably in excess of the molecular proportions required for fixing all of the available sulphate ion or radical.

This mixture of ore material and alkaline earth material is preferably ground or otherwise suitably brought to a finely divided condition, and it is then introduced into a tank or other suitable apparatus which will serve for the ferric chloride solution treatment, as is well understood by those skilled in this art. The mixture of material and aqueous solution is preferably agitated, as by means of air or the chlorine gas introduced into the apparatus, or if desired suitable mechanically rotated paddles may be employed. Also, the solution will be maintained at a correct temperature, as by means of hot air passed into the solution or by other suitable heat controlling devices, so that the temperature will be kept somewhat below the boiling point of the solution and preferably at that temperature at which the sulphur will not melt and form a liquid mass on top of the bath. It is desirable that the sulphur be kept from the molten condition since it tends to coat the ore particles and prevent contact of the chlorine gas therewith.

Although I may add to the digestion apparatus a desired quantity of a suitable reagent, such as manganese chloride, iron chloride, copper chloride and the like, yet in the example given, the iron oxide and the iron sulphide present in the ore material will be attacked by the chloridizing agents in the aqueous bath and will be converted to ferric chloride. If desired, hydrochloric acid gas may be introduced into the ore material, such as in the mixing apparatus, prior to the digesting step so as to form some iron, manganese or copper chloride at this stage of the process by reaction with the oxide of the reagent metal in the roasted ore. Reference may be had to my prior patent for a more complete description of the aqueous bath chloridizing stage of the process. The main reactions taking place are considered to proceed along the lines of the following equations:

$$2ZnS + 4FeCl_3 = 2ZnCl_2 + 4FeCl_2 + S$$
$$2FeCl_2 + Cl_2 = 2FeCl_3$$
$$S + Cl_2 = SCl_2$$
$$SCl_2 + 2H_2O + O_2 = 2HCl + H_2SO_4$$
$$HCl + ZnO = ZnCl_2 + H_2O$$
$$H_2SO_4 + CaCl_2 = 2HCl + CaSO_4$$

As will be observed by reference to the equations, the ferric chloride attacks the zinc sulphide to form zinc chloride and ferrous chloride, and the latter is regenerated to the ferric condition by the chlorine gas which is constantly passed through the apparatus. At the same time there is a tendency for the free sulphur formed by the chloridizing reaction to be itself chloridized to sulphur chloride. This sulphur chloride in the presence of the oxidizing media tends to form both hydrochloric and sulphuric acids. The zinc and iron oxides of the partially roasted ore take up the hydrochloric acid with the formation of zinc and iron chlorides. The sulphate ion will be removed from the solution as an insoluble alkaline earth metal sulphate by reaction with the calcium oxide or calcium chloride introduced for this purpose. If the alkaline earth metal is introduced as an oxide it will be converted to a chloride. Any zinc sulphate which came from the roasting operation will be attacked by this calcium chloride to form zinc chloride and the sulphate ion will form insoluble calcium sulphate and so be removed from the reaction zone. Incidentally, it might be observed that the excess of chlorine gas which is not used up in this process will be suitably recovered as is understood by those skilled in the art. This aqueous bath chloridizing stage is carried on to a point at which sufficient ferric chloride is present to provide enough nascent chlorine for the final finishing stage of the process; but this initial treatment need not be carried on to any definite point or particularly to anywhere near completion of the chloridizing step. Also, it will be understood that the stages of this process may be carried on intermittently or as a continuous operation, as desired.

If desired, and as illustrated in the drawing, the wet slurry taken from the digestion apparatus may be leached with a hot carbon bisulphide solution for the purpose of extracting free sulphur from the mass. To this end, a heated solution of hot carbon bisulphide is passed through the ore material in any suitable type of leaching apparatus and then cooled, allowing the sulphur to crystallize from the solution, after which the sulphur is filtered off and the liquid is again heated for a further extraction. This results in the formation of pure sulphur which may be suitably employed. By this step I remove a considerable proportion of the free sulphur from the ore and thus make it impossible for this sulphur to be oxidized during the final heating operation. Hence, I reduce the amount of alkaline earth metal compound required for the purpose of fixing the available sulphate radical as an insoluble material.

Whether or not this extraction step has been employed, the material is dried, and if necessary ground to a finely divided condition, and then passed into the finishing apparatus. This may be a long, rotary tube suitably heated at the lower end, or it may be a device of the type of a Wedge roaster having a series of shelves over which the material is raked in its passage from the top to the bottom of the apparatus in counterflow relation to the air introduced at the lower end of the device and to any chlorine gas which may be developed in the course of the reaction. This chamber may be heated by suitable means, such as by means of a jacket carrying heated gases. The lower end of the finisher is heated to a temperature at which the ferric chloride is not stable and preferably to a temperature of aproximately 300° C. Oxygen is introduced in sufficient quantity to provide an oxidizing atmosphere. At the temperature maintained at the lower portion of this apparatus the ferric chloride is decomposed in accordance with the following equation to provide nascent chlorine:

$$4FeCl_3 + 3O_2 = 2Fe_2O_3 + 6Cl_2$$

The upper end of the finisher apparatus may serve for drying the slurry. The moisture present in the material being dried as well as moisture which is developed during the chloridizing reactions may not only aid in the chloridizing reactions but it serves further to bring the ferric chloride in solution into close association with the ore particles. Hence when it dries to the solid form as it travels through the apparatus and reaches a temperature at which it is no longer stable, the ferric chloride breaks down with the evolution of nascent chlorine in very intimate contact with the ore particles where it may readily attack the unchloridized portions of the ore and convert them to chlorides. Owing to the counterflow of gas and ore material, the decomposition of the ferric chloride, or other reagent used, proceeds at the hotter end of the finisher in an atmosphere containing oxygen with but little water vapor; hence the major reaction results, either directly or in stages, in the production of chlorine. Whether this reaction goes to completion, with the reagent metal present in the residue wholly as an oxide, depends on the temperature and atmospheric conditions employed. Copper and manganese chloride require higher temperatures than does ferric chloride for their decomposition. During this finisher stage as well as in the aqueous bath chloridizer such difficultly treated materials as zinc ferrite and zinc silicate will be chloridized to form zinc chloride. It will be understood that no zinc sulphate can be formed during the finishing process any more than during the wet stage digestion process owing to the presence of the alkaline earth metal compound employed for fixing the available sulphate radical.

As the result of this step of the process it will be appreciated that such chlorine as was combined with the reagent metal iron has now been recovered and given back to do work in chloridizing more ore particles. Only such chlorine as is present in the calcium chloride goes through this stage unrecovered, but there need be no large excess of calcium chloride beyond that required for forming the insoluble calcium sulphate as above described. Such hydrochloric acid gas or excess of chlorine and water vapor which may be evolved at the upper end of this finisher may be carried to the digestion apparatus and there employed or, if desired, they may be introduced into the material prior to the wet stage of the process. In that case, the gas will attack the dry ore metal oxides as well as the oxides of the reagents, iron, copper and manganese, and form chlorides thereof. It will be understood that the various reagents will behave in accordance with their own peculiar chemical characteristics. For example, cupric oxide will be converted directly to cupric chloride, and this will go to the digester and the finisher for use there in the chloridizing operations. On the other hand, any manganese dioxide in the roasted ore will react with hydrochloric acid gas to produce manganous chloride which will be oxidized to the higher form in the digestion apparatus. This reaction will also produce nascent chlorine gas which in turn will aid in the chloridizing operation by attacking other compounds of the mixture of roasted ore and sulphides. It, however, is to be observed that any chloridizing of sulphites at this stage cannot result in the formation of a sulphate of a chloridizable metal, since the alkaline earth material is capable of reacting preferentially with and fixing the available sulphate radical as an insoluble sulphate and so preventing the formation of zinc sulphate and the like.

The product of the finisher, which is zinc chloride, ferric oxide, calcium sulphate, calcium chloride and the gangue or other ore residue materials, may be suitably treated for recovering the desired ore metal values. For example, as illustrated in the drawing, the finisher product may be leached with water or a weak zinc chloride solution coming from other stages of the process. This forms a solution of zinc and calcium chlorides and leaves a residue of iron oxide, calcium sulphate and other insoluble materials of the gangue. The zinc may be suitably recovered from the solution, such as by adding calcium carbonate thereto and precipitating zinc carbonate, leaving calcium chloride in solution. This solution may be dried and the salt returned to the mixture for reuse or, as illustrated in the drawing, it may be treated with sodium carbonate with the formation of calcium carbonate as a precipitate, which is then cyclically used to treat the zinc and calcium chloride solution; while the sodium chloride solution may be electrolyzed to form chlorine for use in the digestion stage of the process.

It will now be appreciated that I have provided a very simple method of treating a sulphide ore, whether it be simple or complex, and one which does not waste chlorine and so results in high extraction values and an economical and practical process.

Having thus described my invention, what I claim as new and desire to secure by Letters Patent is:

1. The method of treating a metallurgical sulphide ore comprising the steps of digesting the ore in an aqueous solution of a metal chloride capable of reducing from a higher to a lower valency and chloridizing the ore and then removing the material from the aqueous solution and heating it to a temperature at which said metal chloride is not stable and under conditions which cause further chloridizing of the ore materials.

2. The method of treating an ore material containing a metal sulphide comprising the steps of digesting the ore material in finely divided condition in an aqueous bath with a chloride of a metal capable of reducing from a higher to a lower valency and of attacking the ore metal sulphide, while continuously introducing chlorine gas into the bath and regenerating the metal chloride reagent, and thereafter removing the ore material from the bath and heating it to a temperature at which the metal chloride reagent is not stable and under oxidizing conditions capable of developing nascent chlorine for further attack of the ore material.

3. The method of chloridizing a metallurgical ore containing a metal sulphide comprising the steps of treating the ore in finely divided condition with an aqueous solution of the higher chloride of a metal of the group consisting of iron, copper and manganese, maintaining in the solution an alkaline earth metal chloride which is capable of and proportioned for reacting with all available sulphate ion present or formed during the process to fix the same as an insoluble alkaline earth metal sulphate, and thereafter drying and heating the ore material with oxygen to a temperature at which the metal chloride is not stable and under such conditions that nascent chlorine will be developed therefrom and in intimate contact with the ore material for chloridizing the same.

4. The method of chloridizing a metallurgical sulphide ore comprising the steps of providing a mixture containing a metal sulphide, a metal oxide capable of reacting with hydrochloric acid and alkaline earth metal compound capable of and proportioned for reacting with available sulphate radical to form an insoluble sulphate, digesting the ore material in an aqueous solution of a chloride of a metal capable of reducing from a higher to a lower valency and converting an ore metal sulphide to the chloride form, while continuously regenerating the metal chloride reagent by means of chlorine gas, and subsequently drying the ore material and heating it to a temperature at which the metal chloride reagent is not stable and under conditions which cause it to form a metal oxide and give up its chlorine for further chloridizing attack on the material.

5. The method of chloridizing a metallurgical ore containing a metal sulphide comprising the steps of partially roasting the ore and providing a mixture of ore metal oxide and sulphide, mixing the ore material with a sufficient amount of alkaline earth metal compound which is capable of reacting with the available sulphate radical to form an insoluble alkaline earth metal sulphate, treating the material in finely divided condition in the presence of chlorine gas with an aqueous solution of the chloride of a metal of the group consisting of iron, copper and manganese, thereby forming ore metal chloride and alkaline earth metal sulphate, and subsequently drying the ore material and heating it to a temperature at which the metal chloride reagent is not stable and under oxidizing conditions which cause the evolution of chlorine therefrom and further attack on the ore material for chloridizing the same.

6. The method of chloridizing a metallurgical ore containing the sulphides of iron and another chloridizable metal comprising the steps of partially roasting the ore at a low temperature under oxidizing conditions, mixing the roasted material with sufficient alkaline earth metal compound capable of reacting with all available sulphate radical and forming an insoluble sulphate, producing iron chloride from the ore mixture and digesting the mixture in an aqueous solution of ferric chloride, while continuously passing chlorine into the bath, carrying on the process to develop considerable iron chloride, and thereafter drying and heating the ore material to a temperature at which ferric chloride is not stable and under conditions which produce iron oxide and cause further chloridization of the ore.

7. The method of chloridizing a metallurgical sulphide ore comprising the steps of digesting the ore material in an aqueous bath solution of a chloride of a metal capable of reducing from a higher to a lower valency and of forming a chloride of a metal sulphide while continuously passing chlorine into the bath to regenerate said reagent, extracting free sulphur from the ore material, and thereafter drying and heating the material under oxidizing conditions to a temperature at which the metal chloride reagent is not stable and chlorine will be evolved for further treating the ore material.

8. The method of chloridizing a sulphide ore comprising the steps of providing an ore material containing substantial amounts of roasted and unroasted ore metal sulphides, treating the material with an aqueous solution of the higher chloride of a metal of the group consisting of iron, copper and manganese, and carrying on the reaction in the presence of an alkaline earth material capable of and proportioned for fixing all of the available sulphate radical as an insoluble alkaline earth metal sulphate and preventing the formation of a sulphate of a chloridizable ore metal, the roasted ore being used in an amount capable of taking up any hydrochloric acid which is present.

9. The method of claim 8 comprising the steps of introducing chlorine gas into the reagent solution to regenerate the higher chloride of the reagent metal, subsequently drying and heating the ore material under conditions which result in the removal of combined chlorine from the reagent metal chloride for chloridizing untreated portions of the ore material.

10. The method of treating an ore containing the sulphides of a desired ore metal and one of the group consisting of iron, copper and manganese, comprising the steps of roasting the ore under low temperature conditions and producing a mixture containing oxides and sulphides of the ore metals, placing the ore material in an aqueous bath and treating it with chlorine gas, thereby forming a chloride of the metal of the reagent group which serves as a carrier of chlorine for chloridizing ore material, thereafter removing the ore material from the solution and heating the same under oxidizing conditions and to a temperature at which the reagent metal chloride is unstable and is converted to a metal oxide and chlorine gas is generated for further chloridizing treatment.

11. The method of claim 8 in which free sulphur is dissolved from the ore after the aqueous bath chloridizing treatment and the ore material is then heated with oxygen to a temperature which results in the removal of chloridion from the reagent metal chloride associated with the ore material.

12. The method of treating a sulphide ore comprising the steps of partially roasting the same to remove a portion of the sulphide sulphur, then providing a mixture containing an alkaline earth metal compound capable of and proportioned for reacting with all of the sulphate radical rendered available during the entire chloridizing process and fixing the same as an insoluble sulphate, together with a chloridizable compound of a metal which is capable of going from a higher to a lower valency, chloridizing said compound to form the reagent metal chloride, digesting the mixture in an aqueous bath and chloridizing an ore material in the presence of said alkaline earth metal compound, and thereafter removing the ore material from the bath and heating it in the presence of alkaline earth metal chloride and oxygen to a temperature at which the reagent metal chloride is caused to give up combined chlorine for further treatment of the ore.

13. The method of treating a pyritic ore material containing the sulphides of iron and a chloridizable metal comprising the steps of roasting the ore and providing a mixture of ore material in finely divided condition which contains the oxide of a reagent metal of the group consisting of iron, copper and manganese, treating the material to form a chloride of the reagent metal, chloridizing the ore material in suspension in an aqueous solution of the reagent metal chloride and in the presence of an alkaline earth metal chloride which is capable of and is proportioned for reacting with the available sulphate radical to form an insoluble alkaline earth metal sulphate, and thereafter removing and heating the ore material with oxygen to a temperature at which ferric chloride is not stable and ferric oxide is formed.

14. The method of treating a chloridizable sulphide ore containing copper sulphide comprising the steps of roasting the ore, treating the ore material to form cupric chloride therefrom, chloridizing the ore material by means of chlorine developed from said cupric chloride, and carrying on the reaction in the presence of an alkaline earth metal compound which is capable of and is proportioned for reacting with any available sulphate radical to form an insoluble alkaline earth metal sulphate.

15. The method of claim 14 in which the ore material is digested in an aqueous solution of the copper chloride and it is thereafter removed from the bath and heated with oxygen to a temperature at which the copper chloride is converted to an oxide and a chloridizing gas is developed therefrom.

16. The method of treating an ore material containing a chloridizable metal compound and manganese dioxide comprising the steps of treating the ore material with hydrochloric acid and chloridizing the ore in the presence of an alkaline earth metal compound capable of and proportioned for combining with all of the available sulphate radical developed during the process and fixing the same as an insoluble alkaline earth metal sulphate, whereby an ore metal chloride uncontaminated with its sulphate may be produced.

17. The method of treating an ore material containing a chloridizable metal compound comprising the steps of chloridizing it in suspension in an aqueous bath containing a solution of manganese chloride while introducing chlorine gas into the bath, carrying on the process in the presence of alkaline earth metal chloride which is capable of and is proportioned for reacting with all of the available sulphate radical to form an insoluble alkaline earth metal sulphate, and thereafter removing the ore material from the bath and heating it in the presence of oxygen to a temperature above that at which manganese chloride is not stable.

18. The method of treating a sulphide ore containing chloridizable compounds of a desired ore metal and a reagent metal capable of reducing from a higher to a lower valency, comprising the steps of roasting the ore to form the oxide of the reagent metal, converting said oxide to a chloride, digesting the ore in an aqueous bath containing said reagent metal chloride while introducing chlorine gas, and thereafter heating the unchloridized residue in the presence of alkaline earth metal chloride which is capable of and is proportioned for fixing any available sulphate radical as an insoluble sulphate and raising the temperature of the material to a point at which the reagent metal chloride is not stable and a chloridizing reagent containing the element, chlorine, is produced for reacting with unchloridized portions of the ore.

THOMAS A. MITCHELL.